Figure 1:
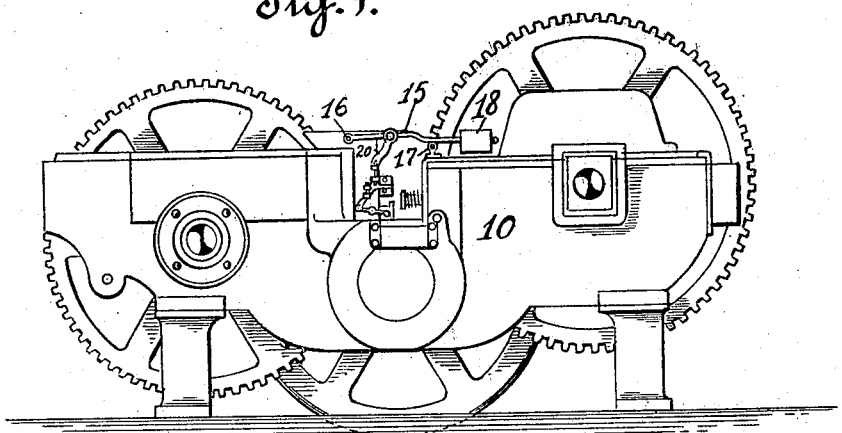

C. R. ROOF.
NUT MAKING MACHINE.
APPLICATION FILED MAY 12, 1915.

1,212,689.

Patented Jan. 16, 1917.

Inventor,
Charles R. Roof,
by Hazard Berry and Miller
Attorneys.

UNITED STATES PATENT OFFICE.

CHARLES R. ROOF, OF LOS ANGELES, CALIFORNIA, ASSIGNOR TO STANDARD NUT MANUFACTURING CO., OF DOVER, DELAWARE, A CORPORATION OF DELAWARE.

NUT-MAKING MACHINE.

1,212,689.   Specification of Letters Patent.   Patented Jan. 16, 1917.

Application filed May 12, 1915. Serial No. 27,504.

*To all whom it may concern:*

Be it known that I, CHARLES R. ROOF, a citizen of the United States, residing at Los Angeles, in the county of Los Angeles and State of California, have invented new and useful Improvements in Nut-Making Machines, of which the following is a specification.

My invention relates to a nut making machine and in particular to novel and improved means for guiding, adjusting, and clamping a heated steel or iron bar from which the blanks for the nuts are cut off.

In the machines as now in use an iron or steel bar of suitable width and thickness is fed along the face of a fixed jaw which latter is provided with a die block, and a cut off punch secured to a reciprocating jaw cuts off a section from the end of said bar. On the face of the fixed jaw a stationary guide block is positioned above the horizontal plane and attached to the upper edge of the die block. A stationary gage block is secured adjacent to the farther vertical edge of the die block. The heated iron or steel bar is fed by the operator along its longitudinal axis, passing over a feed roller secured to the frame of the machine and in advance of the die block. The bar passes horizontally until contacting with the gage block and is so positioned that the extreme end section of the bar covers the die block, and the cut off punch shears or punches off the end section of said bar forming the blank for the nut. Other devices such as piercing and crowning tools coöperate with the cut off punch in forming the nut blank as the same is sheared off from the end of the heated bar and pressed into the die opening but as this invention does not effect any of the succeeding operations they need not be further described.

In my copending case for an apparatus for manufacturing grip nuts, Serial No. 49,186, filed Sept. 7, 1915, the nut-making machine is described in detail. The present invention is concerned only with the bar feeding mechanism.

The normal speed of the movable jaw is about seventy reciprocations a minute, thus forming seventy blank nuts. It is therefore seen that the operator feeding the bar must be alert and constantly feeding the bar against the guide block and in line with the die block. The function of the stationary guide block positioned above the upper edge of the bar to be operated on, was to assist the operator in feeding the bar. But due to the fact that the end of the bar being highly heated easily bends up or down and to the rapidity of the action of the cut off punch, the operator is unable to feed the bar in such a way as to always form perfect blanks. Due to the bending of the bar, the operator, as each succeeding blank is cut off from the end of the bar, gives to said bar a slightly rocking motion up and down and pushes the same forward abutting against the gage block. If the bar is pushed against said gage block it has a tendency to bound back thereby making imperfect blanks. From about one to two per cent. of the blank nuts produced in the machine just described are imperfect and valueless for nuts.

It is the object of this invention to eliminate this waste and to feed the bar to the die block in such a way that none but perfect blanks will result. I effect this by providing a pair of movable guide blocks which guide the bar laterally as the same is fed into the machine, and a movable gage block in the rear of the guide block which comes into action after said movable guide blocks have been moved into an operative position. the function of the gage block being to adjust the end of the bar accurately in relation to the die block so that a perfect blank will be punched out by the cut off punch. The guide blocks and the gage blocks are operated by the reciprocating jaw and the bar is therefore automatically adjusted in position.

Another object of this invention is to provide a bar holding or clamping device having resilient means for holding the bar securely in position for the operation of the cut off punch. In the machines hitherto in use the stresses set up by the cut off punch cause a bending or buckling of the bar adjacent to the end and away from the face of the fixed jaw or dies. Such bending or buckling necessitates a turning of the bar to be fed so that the opposite face is now placed against the face of the jaw or dies and the succeeding action of the cut off punch bending the bar now in the opposite direction would tend to straighten the bar. Furthermore, such bending and buckling was another cause of the imperfect blanks referred to. With my improved bar clamp this bending or buckling of the bar is positively prevented and no turning of the bar while the same is fed to the die block is necessary.

My invention consists in the construction and arrangement of the parts hereinafter described and claimed.

Figure 2:
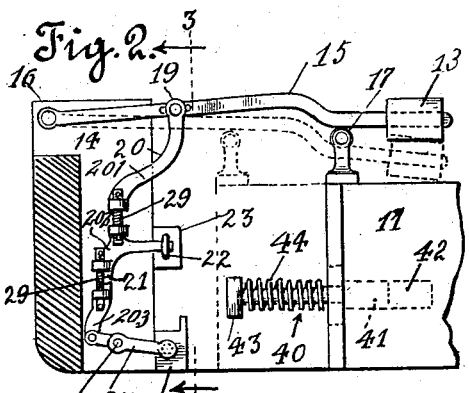
Figure 4:
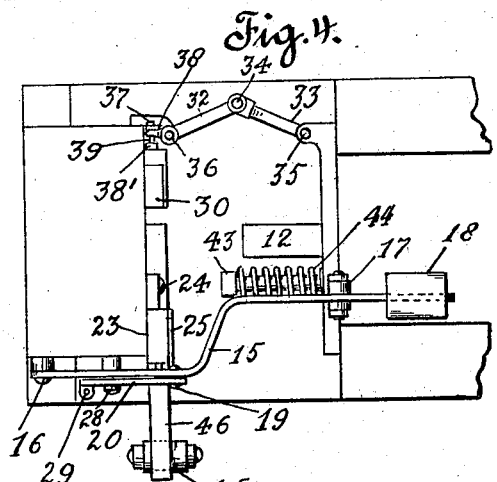
Figure 3:
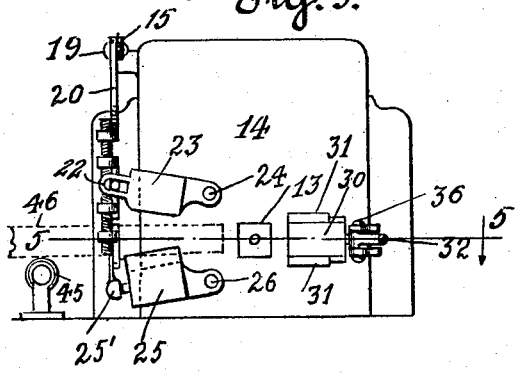
Figure 5:
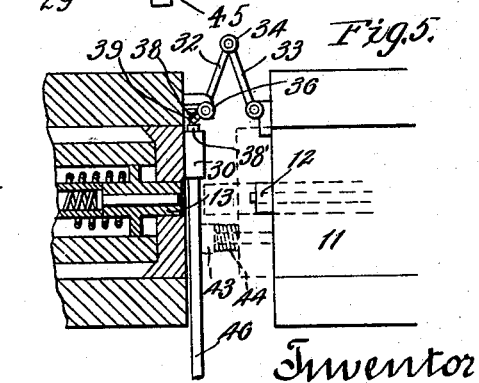

In the accompanying drawings which form a part of this specification: Figure 1 is a front view of the nut making machine showing the improved guide and clamp mechanism. Fig. 2 is an enlarged front view of the guide and clamp mechanism shown in Fig. 1. Fig. 3 is a vertical cross section taken on section line 3—3 of Fig. 2. Fig. 4 is a plan view of the device shown in Fig. 2. Fig. 5 is a horizontal section taken on line 5—5, of Fig. 3.

10 represents a nut making machine to which the improved bar guiding and clamping mechanism is applied. The reciprocating jaw 11 is provided with a cut off punch 12 adapted to coöperate with the die block 13 provided in the stationary or fixed jaw 14. A cam lever 15 is pivoted at 16 to the upper front face of the stationary jaw and extends in a horizontal direction along the face thereof, is bent inwardly, and extends again horizontally resting on an antifriction roller 17 provided on the upper face of reciprocating jaw 11. At the end of cam lever 15 is a weight 18 for the purpose of holding the same in contact with the antifriction roller 17. The lower face of the cam lever is bent downwardly as shown in the drawings, so that when the jaws are in their open position, as shown in Fig. 1 and Fig. 4, the cam lever will occupy its highest position but when the movable or reciprocating jaw moves toward the stationary jaw the weight 18 in conjunction with the formation of the cam face just referred to, will cause the cam lever to occupy the lower position, as indicated by dotted lines in Fig. 2. Pivoted to the cam lever at 19 is a curved arm 20 extending downwardly in front of the face of the stationary jaw. The curved arm 20 consists of an upper section 201 and an intermediate section 202 and a lower section 203. A pair of left and right handed screws 29 connect the intermediate section 202 with the upper and lower sections 201 and 203, respectively. Extending from the intermediate section 202 is a horizontal block 23. Said guide block is pivoted at 24 on the inner face of the stationary jaw and coöperates with the lower guide block 25 pivoted at 26 to the inner face of the stationary jaw in holding the bar from which the blank nuts are to be cut, from lateral movement. The lower guide block 25 is provided at its forward end with a ball and socket joint 25′ connected to the lower section 203 of the arm 20 by a lever 27 being pivoted at an intermediate point as at 28 to the outer face of the stationary jaw. It will be apparent that by means of this construction the guide blocks will simultaneously move toward and away from each other as the curved arm is moved upwardly or downwardly by means of the cam lever 15. By means of the screws 29 the length of the curved arm 20 may be adjusted as will be understood. This adjustment will in turn change the amount of movement of the guide blocks toward and away from each other. Such adjustment is desirable in case bars of different widths are used for making blanks. To the rear of die block 13 is the gage block 30 horizontally movable between guides 31, said guides being secured to the inner face of the stationary jaw. As shown in Fig. 4, a link 33 is pivoted to the reciprocating jaw at 35, and to another link 32 at 34. The other end of link 32 is pivoted at 36 to the inner face of the stationary jaw and is provided with a forked end 37 which engages a pair of lugs 38 and 38′ spaced apart and secured to a pin 39 extending from the gage block. As the movable jaw approaches the stationary jaw, the forked end of link 32 will engage lug 38′ and move the gage block forwardly adjusting the bar in relation to the die block 13. Because of the spacing of lugs 38 and 38′ gage block 30 will be operated only after the lateral guide blocks 23 and 25 have been moved into an operative position.

In order to prevent any bending or buckling of the bar as the end sections are cut by the cut off punch to form nut blanks, I have provided a bar clamp 40 which comprises an inner or plunger member 41 slidably mounted for reciprocal movement in a socket 42 in the movable jaw. The plunger carries on its outer end a stem of small diameter which extends outwardly therefrom through the reduced opening of socket 42. The annular shoulder thus formed on the outer end of the plunger abuts against the outer end of socket 42, thereby limiting the forward movement of plunger 41. The forward end of the guide clamp is provided with a head portion 43 adapted to engage the bar to be operated on. Encircling the stem of the clamp and interposed between the face of the movable jaw and head 43 is a helical spring 44 holding said bar clamp in its extended position with the annular shoulder of the plunger 41 abutting against the reduced opening of the plunger socket in the face of the movable jaw. As shown in Fig. 4, the bar clamp is located in advance of the cut off punch and its length extends beyond that of said punch. When the machine is operated, the bar clamp will engage the bar in advance of the cut off punch and hold the same firmly in position, the helical spring 44 allowing the plunger portion to recede into socket 42 as the cut off punch engages the bar to cut off the blank nut.

From the foregoing description, the operation of the guiding and clamping mechanism will be easily understood. A steel or iron bar properly heated for a length of four or five feet is fed edgewise into the nut making machine resting and passing over anti-friction roller 45 secured to the frame of the machine. The bar is passed between the lateral guide blocks toward and for some distance beyond the die block 13. As the reciprocating jaw approaches the stationary jaw, cam lever 15 will be lowered, as shown by dotted lines in Fig. 2, and will cause the lateral guide blocks to approach each other keeping the bar 46 from lateral movement. I preferably provide the lower guide block with a retaining flange 47 tending to hold bar 46 against the inner face of the stationary jaw. As the movable jaw continues in its movement toward the stationary jaw, the link 32 will cause the forked end to engage the forward lug 38' on pin 39 of the gage block 30 which will move toward the die block 13 adjusting bar 46 in its position for the operation of the cut off punch 12. Before said punch comes into operation, the bar clamp 40 will engage the bar in advance of the die block and hold the same yieldingly yet firmly while the punch cuts off the end section of bar 46 to form a blank nut. On the backward movement the guide blocks and the gage block will be returned to their normal positions.

Referring to Fig. 5 of the drawings, the dotted lines of the cut-off punch 12 and the clamping member 43 indicate their position when the bar 46 is at the moment of being operated on by the cut-off punch 12 coacting with the die 13. The clamp 43 holds the bar 46 firmly in position, while the cut-off punch 12 shears off the end section of the bar and by coacting with the die block 13 forms the nut blank.

The construction and operation of the nut making machine is no part of my invention, the one shown in the drawings being a standard make for manufacturing nuts.

It is therefore seen that my improved guiding and clamping mechanism will accurately position the bar over the die block and hold the same firmly in place while the cut off punch shears off the end section. It requires no skill on the part of the operator to feed the bar to be operated on into the machine. All he has to do is to push the bar in a horizontal direction against the gage block and it is not necessary for him to position the bar as the guide blocks in conjunction with the gage block and the bar holder accurately position and hold the bar in place for the operation of the cut off punch.

While I have shown a preferred form of the guide and clamping mechanism, it will be obvious that various changes may be made by those skilled in the art, within the spirit of my invention and within the scope of the appended claims.

I claim:

1. In a bar guiding and clamping device for nut making machines, a fixed jaw, a reciprocating jaw, a blank nut cutting tool on said reciprocating jaw, a cam lever pivoted at one end on said fixed jaw, a weight on the other end of said cam lever, a cam lever engaging roller on said reciprocating jaw, a pair of guide blocks pivoted on said fixed jaw movable toward and away from each other, an adjustable connection between said blocks and said cam lever, a movable gage block, a pair of links pivoted to said reciprocating jaw, a lost motion connection between said gage block and said pair of links, and a bar clamping mechanism holding said bar in an adjusted position in advance of said tool, said bar clamping mechanism comprising a plunger body slidably mounted in the reciprocating jaw, and a spring tending to hold said clamping mechanism against said bar.

2. In a bar guiding and clamping device for nut making machines, a fixed jaw, a reciprocating jaw, a blank nut cutting tool on said reciprocating jaw, a bar supporting anti-friction roller, a cam lever pivoted at one end on one of said jaws, a cam lever engaging element mounted on the other jaw for raising and lowering said cam lever, a pair of guide blocks movably mounted on said fixed jaw, an adjustable connection between said cam lever and said guide blocks, a movable gage block, a pair of links connected to said reciprocating jaw, a lost motion connection between said gage block and said pair of links, and a bar clamping mechanism holding said bar in an adjusted position in advance of said tool.

3. A bar guiding and clamping device for nut making machines, a fixed jaw, a reciprocating jaw, a blank nut cutting tool on said reciprocating jaw, a cam lever pivoted at one end on said fixed jaw, a cam lever engaging roller on said reciprocating jaw, a pair of guide blocks pivoted on the fixed jaw movable toward and away from each other, an adjustable connection between said blocks and said cam lever, a gage block, means pivoted to the reciprocating jaw for operating said gage block, a lost motion connection between said gage block and said means, and a bar clamping mechanism mounted in said reciprocating jaw for holding said bar in an adjusted position in advance of said tool.

4. In a bar guiding and clamping device for nut making machines, a fixed jaw, a reciprocating jaw, a blank nut-cutting tool on said reciprocating jaw, a pair of guide blocks on the fixed jaw movable toward and away from each other, means connected to said reciprocating jaw for operating said guide blocks, a movable gage block, means connected to said reciprocating jaw for operating said gage block, and a lost-motion connection between said gage block and said means.

5. In a bar guiding and clamping device for nut making machines, a fixed jaw, a reciprocating jaw, a blank nut cutting tool on said reciprocating jaw, a cam lever pivoted at one end on said fixed jaw, a cam lever engaging roller on said reciprocating jaw, means for holding said cam lever in engagement with said roller, a pair of guide blocks on said fixed jaw movable toward and away from each other, a connection between said blocks and said cam lever, a movable gage block, means for operating said gage block connected to said reciprocating jaw, and a bar clamping mechanism engaging said bar between said guide blocks and said gage block.

6. In a bar guiding and clamping device for nut making machines, a fixed jaw, a reciprocating jaw, a blank nut cutting tool on said reciprocating jaw, movable guide blocks for engaging the bar to be operated on and holding the same against lateral movement, a movable gage block adjusting said bar in relation to said tool, and a bar clamping mechanism engaging said bar in advance of said tool.

7. In a bar guiding and clamping device for nut making machines, a fixed jaw, a reciprocating jaw, a blank nut cutting tool on said reciprocating jaw, a pair of movable guide blocks for engaging the bar to be operated on and holding the same against lateral movement, a movable gage block adjusting said bar in relation to said tool, and a bar clamping mechanism.

8. In a nut making machine, a fixed jaw, a reciprocating jaw, a blank nut-cutting tool on said reciprocating jaw, a movable gage block on said fixed jaw, means connected to said reciprocating jaw for operating said gage block, and a bar clamping mechanism holding said bar in an adjusted position in advance of said tool.

In witness that I claim the foregoing I have hereunto subscribed my name this 6th day of May, 1915.

CHARLES R. ROOF.

Copies of this patent may be obtained for five cents each, by addressing the "Commissioner of Patents, Washington, D. C."